J. G. VINCENT.
MOTOR VEHICLE.
APPLICATION FILED SEPT. 6, 1913.

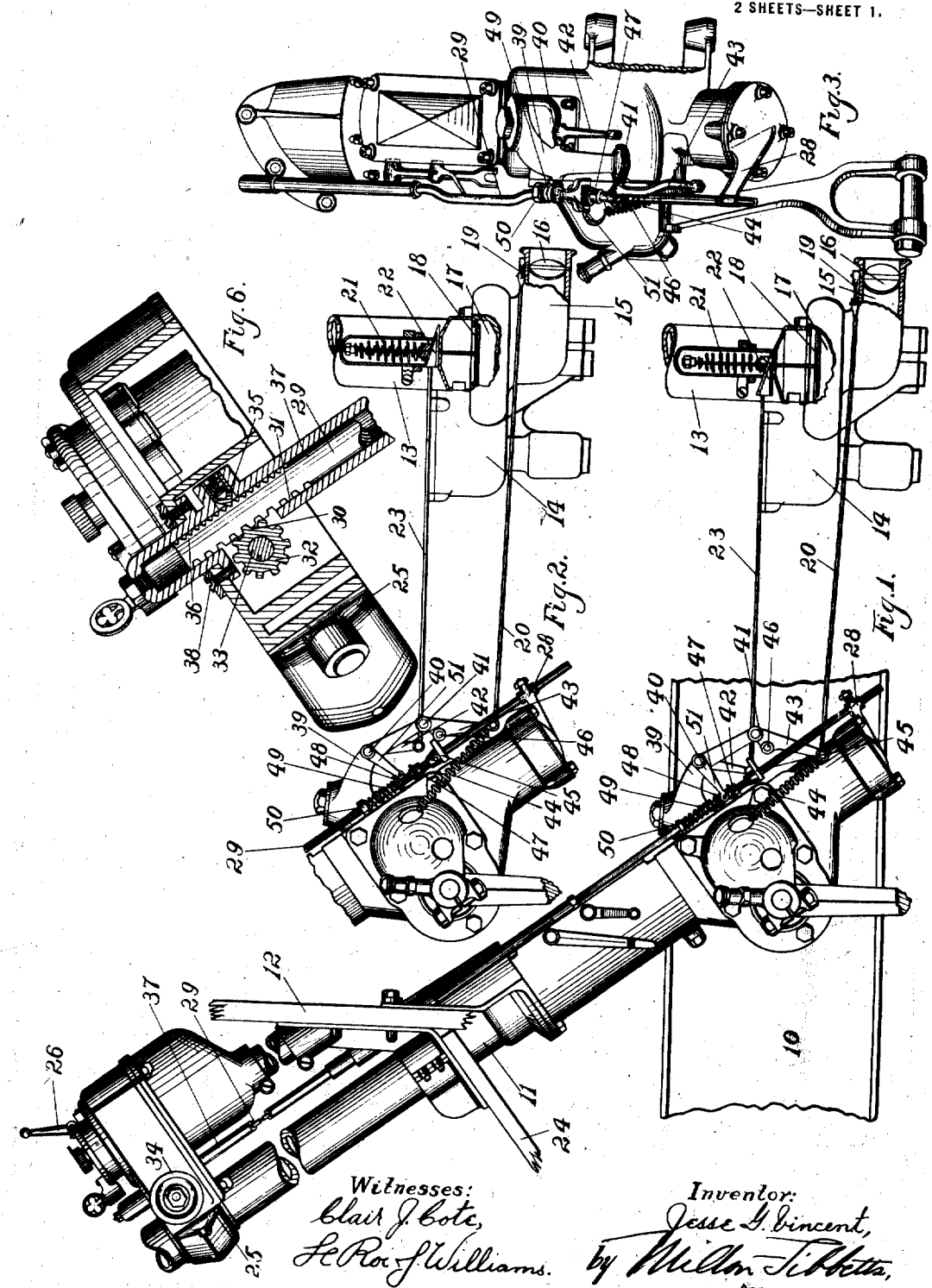

1,229,682.

Patented June 12, 1917.
2 SHEETS—SHEET 2.

Witnesses:
Blair J. Cote,
H. Roi J. Williams.

Inventor:
Jesse G. Vincent,
by Milton T. Pitts,
Attorney.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,229,682.  Specification of Letters Patent.  Patented June 12, 1917.

Application filed September 6, 1913. Serial No. 788,493.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles, and particularly to the mechanism for controlling the motor.

One of the objects of the invention is to simplify the mechanism for the control of the motor and particularly of the carbureter thereof, and to place said mechanism within easy reach of the operator of the vehicle. With this and other objects in view, the invention will be described in connection with the drawings, which form a part of this specification, and in which, Figure 1 is a side elevation of parts of a motor vehicle, including the steering column and carbureter and connecting devices;

Fig. 2 is a view similar to Fig. 1, showing the connecting devices in a different position;

Fig. 3 is a front view of a part of the steering column shown in Fig. 1;

Fig. 6 is a section approximately on the line 6—6 of Figs. 4 and 5.

Figure 4:
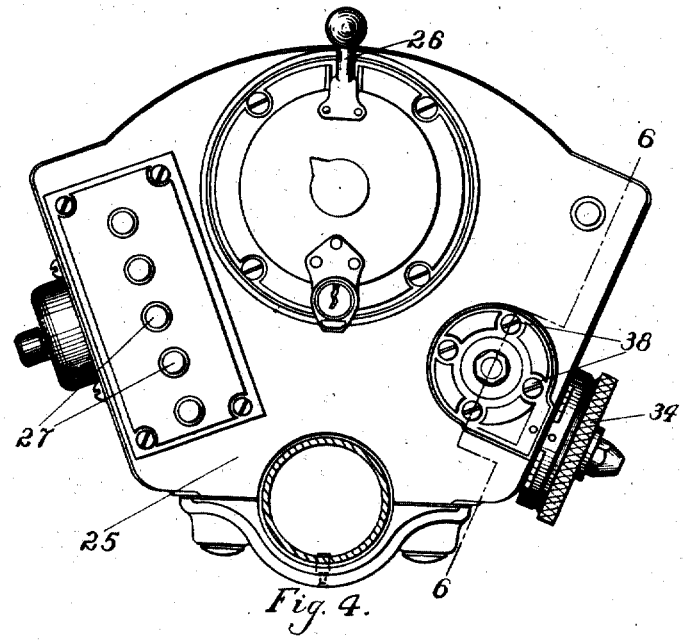
Fig. 4 is a top view of the control board mounted on the steering column shown in Fig. 1.

Referring to the drawings, 10 represents part of a motor vehicle frame, upon which the steering column 11 and the dash 12 are supported. The vehicle motor is also supported upon this frame in the usual manner, and the intake pipe 13 of the motor is shown in Figs. 1 and 2. The motor carbureter 14 is supported from the intake pipe 13 and is provided with a main air intake passage 15 controlled by a butterfly valve 16, and an auxiliary air passage 17 controlled by a spring operated puppet valve 18. As shown in Figs. 1 and 2, the butterfly valve 16 may be moved from its open and closed positions by the arm 19 and rearwardly extending rod 20, and the tension of the springs 21 of the valve 18 may be regulated by a wedge shaped cam 22 operated by a rearwardly extending rod 23.

The dash 12, hereinabove referred to, and the inclined floor board 24 assist in supporting the steering column 11, and adjacent the upper end of the steering column is a bracket 25 which may be in the form of a control board, and which is positioned, as will be seen in the drawing, within easy reach of the operator of the vehicle. Upon this control board may be arranged various switches and other control devices, such as the ignition switch 26, electric light buttons 27, etc.

Figure 5:
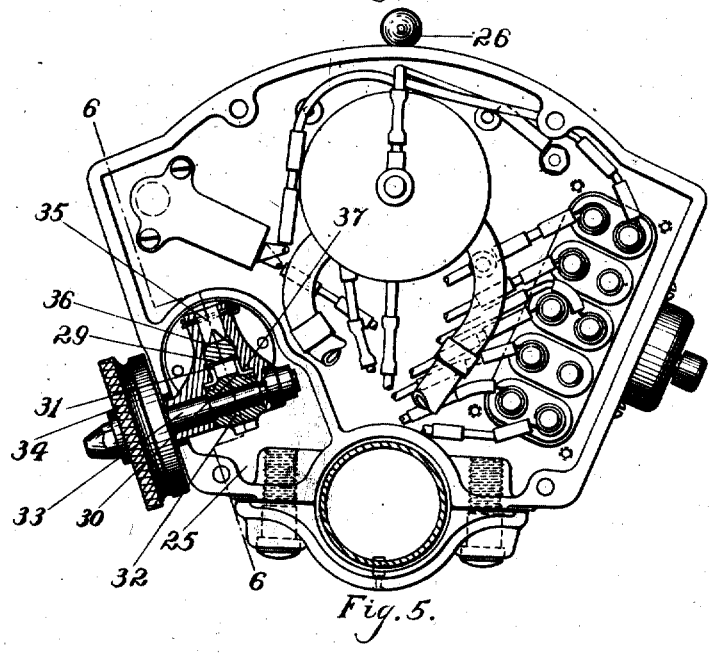
Fig. 5 is an underneath view of said control board, showing parts in section.

At the lower end of the steering column 11 is another bracket marked 28, and mounted to slide in the brackets 25 and 28 is a control rod 29, which is adapted to be moved longitudinally by the operator of the vehicle through a rack and pinion mechanism 30, shown in detail in Figs. 5 and 6. This mechanism includes a rack 31 formed in the upper end of the control rod 29, and a pinion 32 keyed to a shaft 33 mounted in the bracket or control board 25 and extending through one of the sides of said control board. A hand wheel 34 is secured to the projecting shaft 33, whereby the operator may rotate the shaft 33 and thereby move the rod 29 longitudinally. The rod is retained in adjusted position by a spring pawl 35 acting on a ratchet 36 formed in the upper end of the rod 29, as shown particularly in Figs. 5 and 6.

It will be seen also that this rack and pinion mechanism and the pawl and ratchet device are mounted in a supporting casing 37, which is itself secured to the control board 25, as by screws 38.

Adjacent the lower end of the steering column is a bracket 39 which independently supports two bell cranks 40 and 41, the former of which has its arm 42 connected to the rearward end of the rod 23, and the latter of which has its arm 43 connected to the rearward end of the rod 20. The rearward end of the rod 20 is also secured to a spring 44, which thereby yieldingly holds the butterfly valve 16 in wide open position, as shown in Fig. 1.

Secured in a predetermined position upon the rod 29 is a finger 45, which is adapted to strike the arm 46 of the bell crank 41 as the rod 29 is moved longitudinally. Also on the rod 29, just above the finger 45, are two stops 47 and 48, the former of which is pinned to the rod, and the latter of which slides thereon and is pressed toward its mate by a spring 49 surrounding the rod and adjustable thereon by the nut 50. The arm 51 of the bell crank 40 operates between the stops 47 and 48, so that when the rod 29 is moved longitudinally downward it carries with it the arm 51 and consequently moves the rod 23 and wedge 22 to thereby increase the tension of the springs 21, it being understood that the spring 49 is sufficiently strong to accomplish this purpose. The parts on the rod 29 are so arranged that as soon as the wedge 22 has been moved forwardly to give the maximum tension on the springs 21, the finger 45 will begin to operate upon the arm 46, and the continued downward movement of the rod 29 will carry with it the rod 20 and consequently close the butterfly valve 16. It will therefore be seen that the longitudinal movement of the rod 29 downwardly will first operate upon the valve springs 21 until those springs have reached their maximum tension, and then act upon the valve 16 to close the main air intake passage 15. In other words, the rod 29 actuates *seriatim* the devices controlling the two valves of the carbureter, thus increasing the richness of the mixture of the carbureter as the rod 29 is moved downwardly, and vice versa.

In Fig. 1, the carbureter valves are shown with the lightest tension on the springs 21 and with the main air intake 15 wide open. In Fig. 2, the rod 29 has been moved downwardly to the farthest extent, and the wedge 22 has increased the tension on the spring 21 to the maximum, and the valve 16 has practically closed the main air intake passage 15, so that the carbureter will deliver the richest possible mixture, which is what is usually required in starting the motor in cold weather.

Having thus described my invention, what I claim and desire to secure by Letters Patent is,

1. In a motor vehicle the combination with the steering column, a control rod mounted thereon, and a device at the upper end of the steering column for actuating said rod, of a carbureter having a plurality of valves, rods for controlling said valves, levers to which said rods are connected, and means on said control rod for yieldingly engaging one of said levers and for positively engaging the other of said levers.

2. In a motor vehicle, the combination with the steering column, a control rod mounted thereon, and a device at the upper end of the steering column for actuating said rod, of a carbureter having a plurality of valves, rods for controlling said valves, levers to which said rods are connected, a spring device on said control rod for engaging one of said levers and a rigid device on said rod for engaging the other of said levers.

3. In a motor vehicle, the combination with the steering column, a control rod mounted thereon, and a device at the upper end of the steering column for actuating said rod, of a carbureter having a plurality of valves, rods for controlling said valves, levers to which said rods are connected, and means on said control rod for engaging said levers *seriatim*.

4. In a motor vehicle, the combination with the steering column, and the carbureter having a plurality of air valves, and independent connections from said valves to the steering column, of means on the steering column for controlling said valves *seriatim*.

5. In a motor vehicle, the combination with the steering column, and the carbureter having a plurality of valves, of independent connecting rods from said valves to the steering column, levers on the steering column to which said rods are connected, and a common means for actuating said levers *seriatim*.

6. In a motor vehicle, the combination with the steering column having a control board thereon, and the motor carbureter having valves, of means for controlling said valves comprising a rod extending through said control board, and a hand wheel on the side of said control board connected to operate said rod.

In testimony whereof I affix my signature in the presence of two witnesses.

JESSE G. VINCENT.

Witnesses:
C. S. FREEMAN,
L. A. WING.